US011675260B2

(12) United States Patent
Zhang

(10) Patent No.: US 11,675,260 B2
(45) Date of Patent: Jun. 13, 2023

(54) MODELING PROJECTION LAMP

(71) Applicant: GEMMY INDUSTRIES CORPORATION, Coppell, TX (US)

(72) Inventor: Cheng-Chun Zhang, Shenzhen (CN)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 60 days.

(21) Appl. No.: 17/489,776

(22) Filed: Sep. 30, 2021

(65) Prior Publication Data
US 2023/0111641 A1    Apr. 13, 2023

(51) Int. Cl.
| | |
|---|---|
| *G03B 21/20* | (2006.01) |
| *G03B 21/14* | (2006.01) |
| *F21V 21/30* | (2006.01) |
| *F21V 14/08* | (2006.01) |
| *F21V 21/088* | (2006.01) |
| *F21S 10/00* | (2006.01) |

(52) U.S. Cl.
CPC ........ *G03B 21/2046* (2013.01); *F21S 10/007* (2013.01); *F21V 14/08* (2013.01); *F21V 21/088* (2013.01); *F21V 21/30* (2013.01); *G03B 21/145* (2013.01)

(58) Field of Classification Search
CPC .. H04N 9/3141; H04N 9/3152; H04N 9/3155; H04N 9/3158; H04N 9/3161; H04N 9/3164; G03B 21/14; G03B 21/20; G03B 21/145; G03B 21/208; G03B 21/2013; G03B 21/2033; G03B 21/2046; G03B 21/2053; F21V 21/26; F21V 21/29; F21V 21/084; F21V 21/088; F21V 14/065; F21V 14/08; F21V 14/085; F21S 10/005; F21S 10/007; F21S 10/026; F21S 10/046
See application file for complete search history.

(56) References Cited

U.S. PATENT DOCUMENTS

| | | | | |
|---|---|---|---|---|
| 6,073,892 | A * | 6/2000 | Dittmer | F16M 13/027 74/89.21 |
| 9,429,825 | B2 * | 8/2016 | Dundee | F16M 11/125 |
| 2011/0090470 | A1 * | 4/2011 | Chien | F21S 10/00 362/641 |

* cited by examiner

*Primary Examiner* — Sultan Chowdhury
(74) *Attorney, Agent, or Firm* — Hershkovitz & Associates, PLLC; Abe Hershkovitz

(57) ABSTRACT

A modeling projection lamp has a stand, a driving assembly, a first pattern frame, and a second pattern frame. The stand has a first swing bracket and a first gear. The first gear is mounted on the first swing bracket. The driving assembly has a rotating mechanism and a second swing bracket. The rotating mechanism can drive the second swing bracket so that the first swing bracket is swung about a first axis and the second swing bracket is swung about a second axis at the same time. The second pattern frame is movably connected to the second swing bracket. With the second swing bracket swinging with respect to the first swing bracket, the second pattern frame can moves or rotates with respect to the first pattern frame. Therefore, the image formed via the first pattern and the second pattern can be a dynamic image.

14 Claims, 16 Drawing Sheets

MODELING PROJECTION LAMP

BACKGROUND OF THE INVENTION

1. Field of the Invention

The present invention relates to a projection lamp, especially to a lamp that is capable of projecting a pattern.

2. Description of the Prior Arts

A conventional modeling projection lamp is configured to project a specific image including bright portions and shadow portions. Therefore, a storekeeper may set a modeling projection lamp at the shop door, thereby projecting a representative symbol of the store onto nearby ground or wall to attract the attention of people passing by. Besides, on festivals or holidays, the modeling projection lamp may project a symbol of the festivals or holidays, which let people get immersed deeper in the festive atmosphere.

However, even though the conventional modeling projection lamp comprises a moving means configured to move the projected image, the projected image only can be moved as a whole. In other words, the pattern is not dynamic, which makes the attraction not alluring enough.

To overcome the shortcomings, the present invention provides a modeling projection lamp to mitigate or obviate the aforementioned problems.

SUMMARY OF THE INVENTION

The main objective of the present invention is to provide a modeling projection lamp that can be hung on a ceiling or an upper end of a foundation frame and is capable of projecting a dynamic image.

The modeling projection lamp has a stand, a driving assembly, an illumination assembly, a lens assembly, a first pattern frame, and a second pattern frame. The stand has a stationary bracket and a first swing bracket. The first swing bracket is connected to the stationary bracket and is capable of swinging about a first axis with respect to the stationary bracket. The driving assembly has a rotating mechanism, a rotating arm, and a second swing bracket. The rotating arm has a first end and a second end. The first end of the rotating arm is rotatably connected to the rotating mechanism. The second end of the rotating arm is opposite the first end. The second swing bracket is rotatably connected to the second end of the rotating arm and connected to the first swing bracket. The second swing bracket is capable of swinging about a second axis with respect to the first swing bracket. The second axis being non-parallel with the first axis. The illumination assembly, the lens assembly, and the first pattern frame are securely mounted on the second swing bracket. The first pattern frame is further located between the illumination assembly and the lens assembly. The second pattern frame is movably connected to the second swing bracket and located between the illumination assembly and the lens assembly.

In a preferred embodiment, when the rotating arm is rotated, the first swing bracket is driven to swing about the first axis with respect to the stationary bracket, and the second swing bracket is driven to swing about the second axis with respect to the first swing bracket at the same time. Thus, after the first swing bracket or the second swing bracket is swung, the second pattern frame is tilted, thereby reciprocating or rotating with respect to the first pattern frame because of gravity.

In another preferred embodiment, when the rotating arm is rotated, the first swing bracket is driven to swing about the first axis with respect to the stationary bracket, and the second swing bracket is driven to swing about the second axis with respect to the first swing bracket at the same time, too. Then, when the second swing bracket swings with respect to the first swing bracket, a first gear mounted on the first swing bracket is capable of driving tooth portions of the second pattern frame, thereby driving the second pattern frame to reciprocate or rotate with respect to the first pattern frame.

In the present invention, the illumination assembly and the lens assembly project light through the first pattern and the second pattern and thus form an image. With the driving assembly driving the second pattern frame and the first pattern frame to move or rotate with respect to each other, the images formed via the first pattern and the second pattern can reciprocate or rotate with respect to each other, so the entire image is dynamic.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
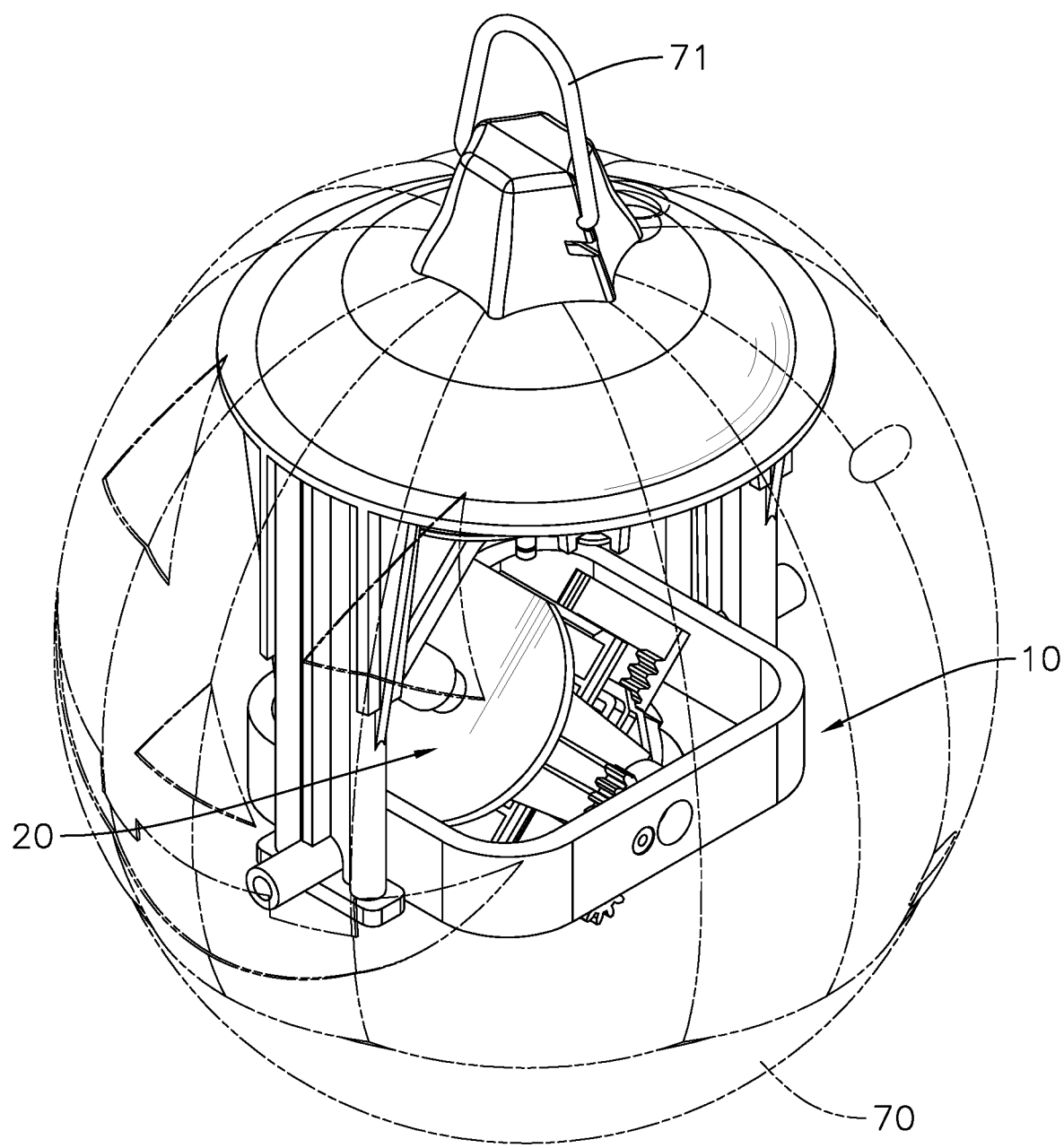
FIG. 1 is a perspective view of a modeling projection lamp in accordance with the present invention.
Figure 2:
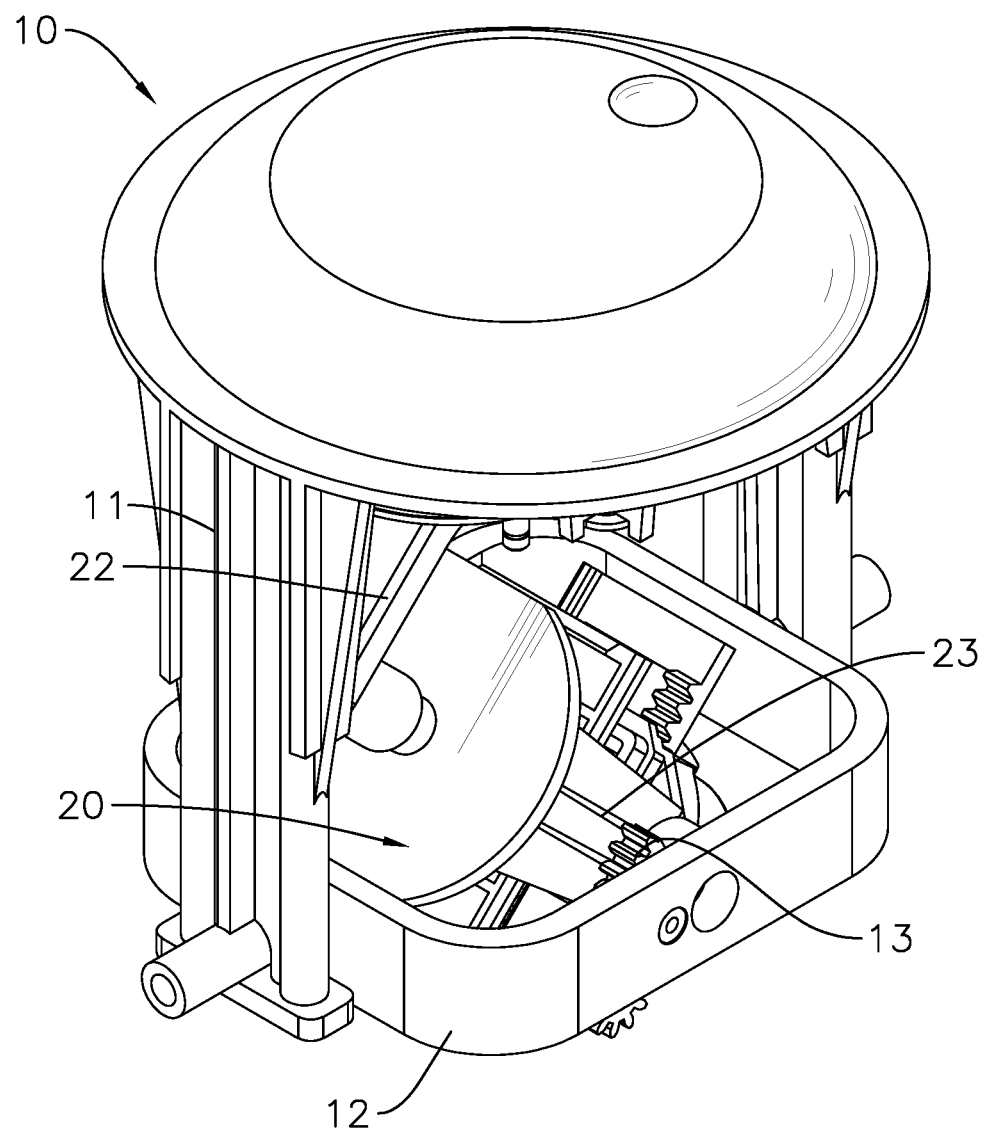
FIG. 2 is a perspective view of the modeling projection lamp in FIG. 1, shown without a casing.

With reference to FIG. 1 to FIG. 5, a modeling projection lamp in accordance with the present invention is provided. The modeling projection lamp comprises a stand 10, a driving assembly 20, an illumination assembly 30, a lens assembly 40, a first pattern frame 50, and a second pattern frame 60, and selectively comprises a casing 70.

The stand 10, the driving assembly 20, the illumination assembly 30, the lens assembly 40, the first pattern frame 50, and the second pattern frame 60 may be mounted in the casing 70. The appearance of the casing 70 may be festive imagery, a mascot of the store, or other images. For example, in this embodiment, the appearance of the casing 70 is a pumpkin with Halloween imagery. In this embodiment, the casing 70 comprises a ring 71, so that the modeling projection lamp of the present invention can be hung on the ceiling or an upper end of a foundation frame.

The stand 10 comprises a stationary bracket 11 and a first swing bracket 12. Further, in this embodiment, the stand 10 comprises a first gear 13. The stationary bracket 11 is fixed on the casing 70, so the stationary bracket 11 and the casing 70 cannot be moved with respect to each other. The first swing bracket 12 is connected to the stationary bracket 11 and can be swung about a first axis with respect to the stationary bracket 11. The first gear 13 is securely mounted on the first swing bracket 12.

Figure 6:
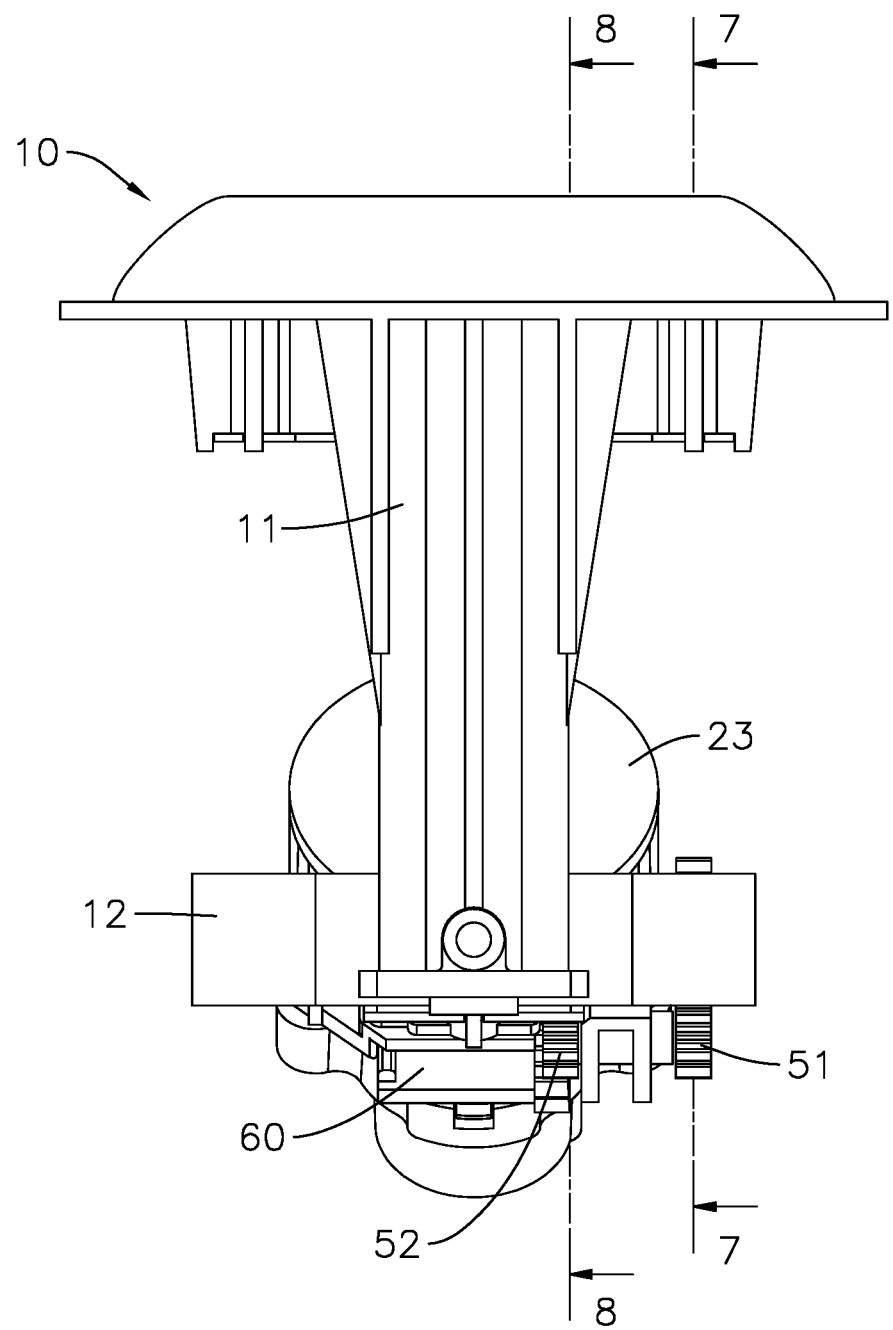
FIG. 6 is another side elevation view of the modeling projection lamp in FIG. 1, shown without the casing.
Figure 7:
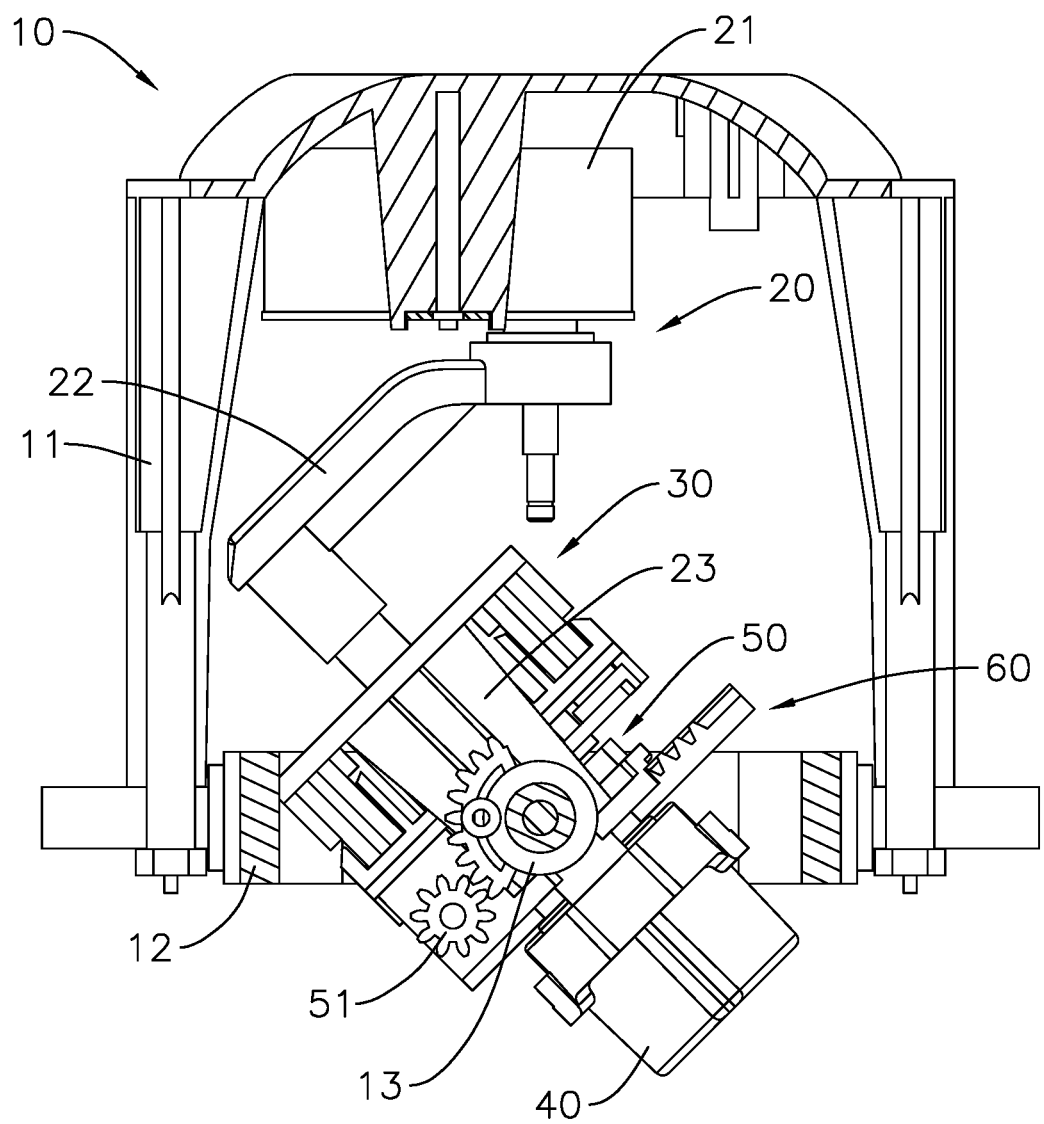
FIG. 7 is a sectional view of the modeling projection lamp across line 7-7 in FIG. 6, shown without the casing.
Figure 8:
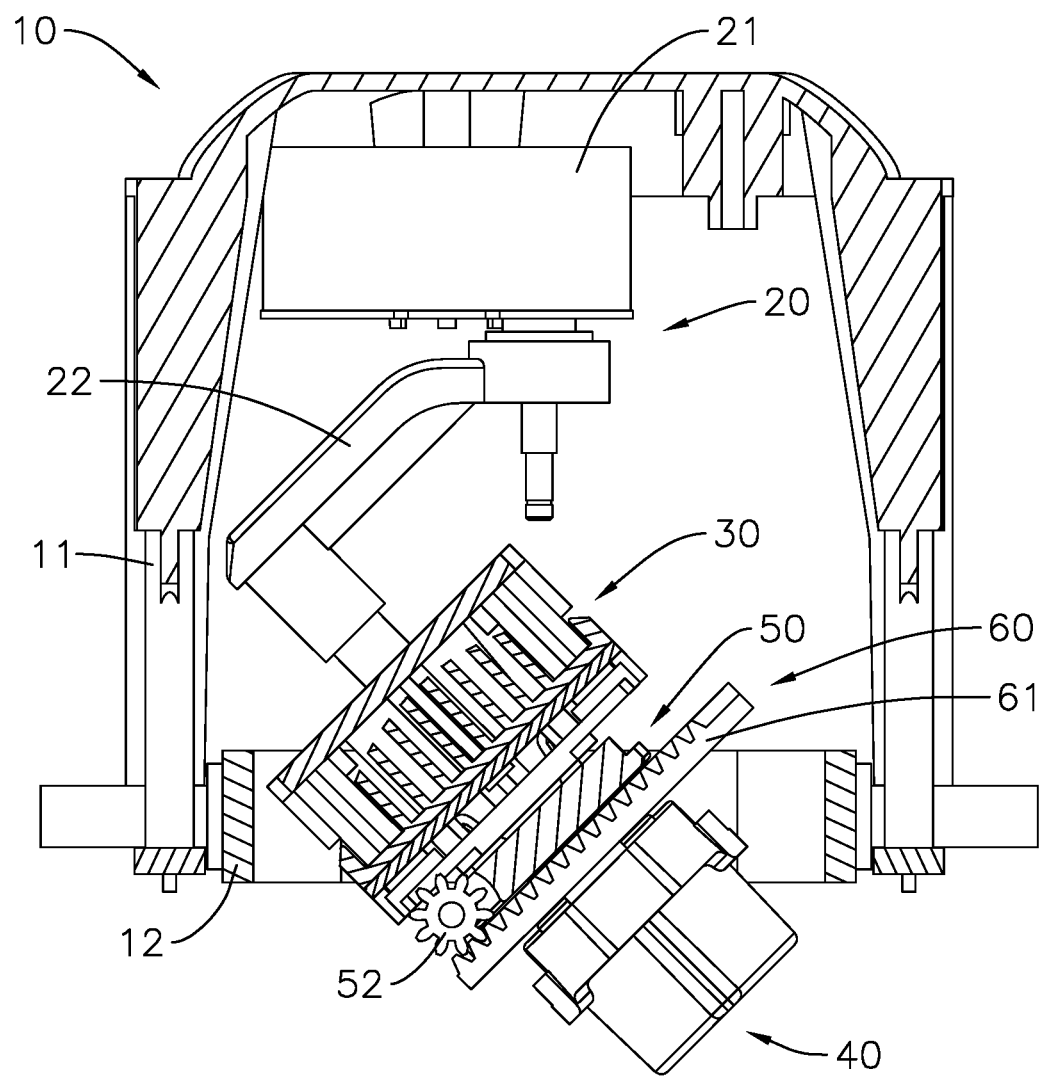
FIG. 8 is a sectional view of the modeling projection lamp across line 8-8 in FIG. 6, shown without the casing.

Then please refer to FIG. 6 to FIG. 8. The driving assembly 20 comprises a rotating mechanism 21, a rotating arm 22, and a second swing bracket 23. The rotating mechanism 21 may be a motor and thus comprises a rotating output shaft. The rotating arm 22 comprises a first end and a second end opposite to each other. The first end of the rotating arm 22 is connected to the rotating mechanism 21. Precisely, the first end of the rotating arm 22 is securely mounted on the rotating output shaft and thereby is capable of being rotated by the rotating mechanism 21. In other words, the second end of the rotating arm 22 is rotated about the first end of the rotating arm 22. The second swing bracket 23 is rotatably connected to the second end of the rotating arm 22, and is connected to the first swing bracket 12 and can be swung about a second axis with respect to the first swing bracket 12. The first axis is not parallel with the second axis. In this embodiment, the first axis is perpendicular to the second axis, but it is not limited thereto. Besides, in this embodiment, an axis of the first gear 13 is located on an imaginary extending line of the second axis.

Figure 3:
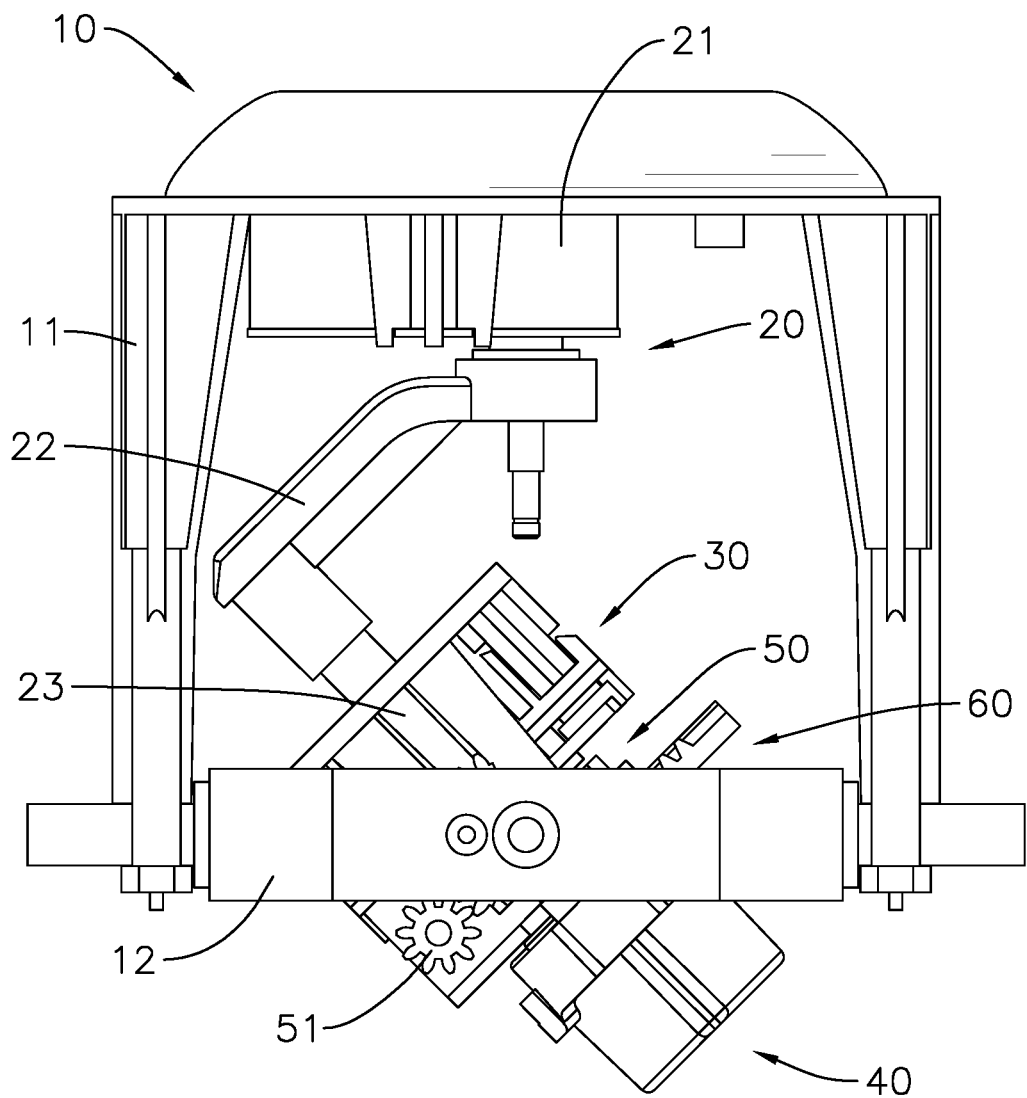
FIG. 3 is a side elevation view of the modeling projection lamp in FIG. 1, shown without the casing.
Figure 4:
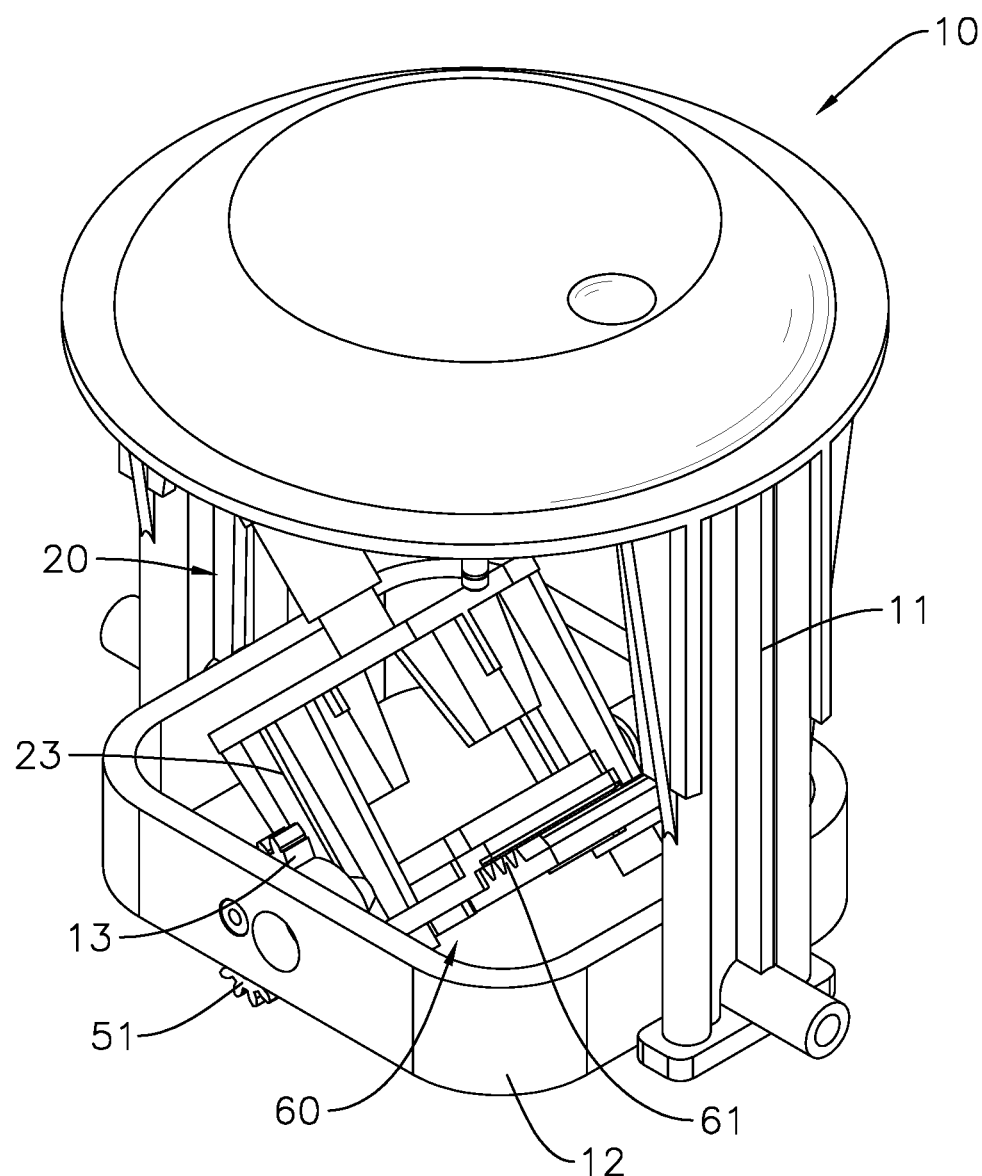
FIG. 4 is a perspective view of a stand, a driving assembly, and a second pattern frame of the modeling projection lamp in FIG. 1.
Figure 5:
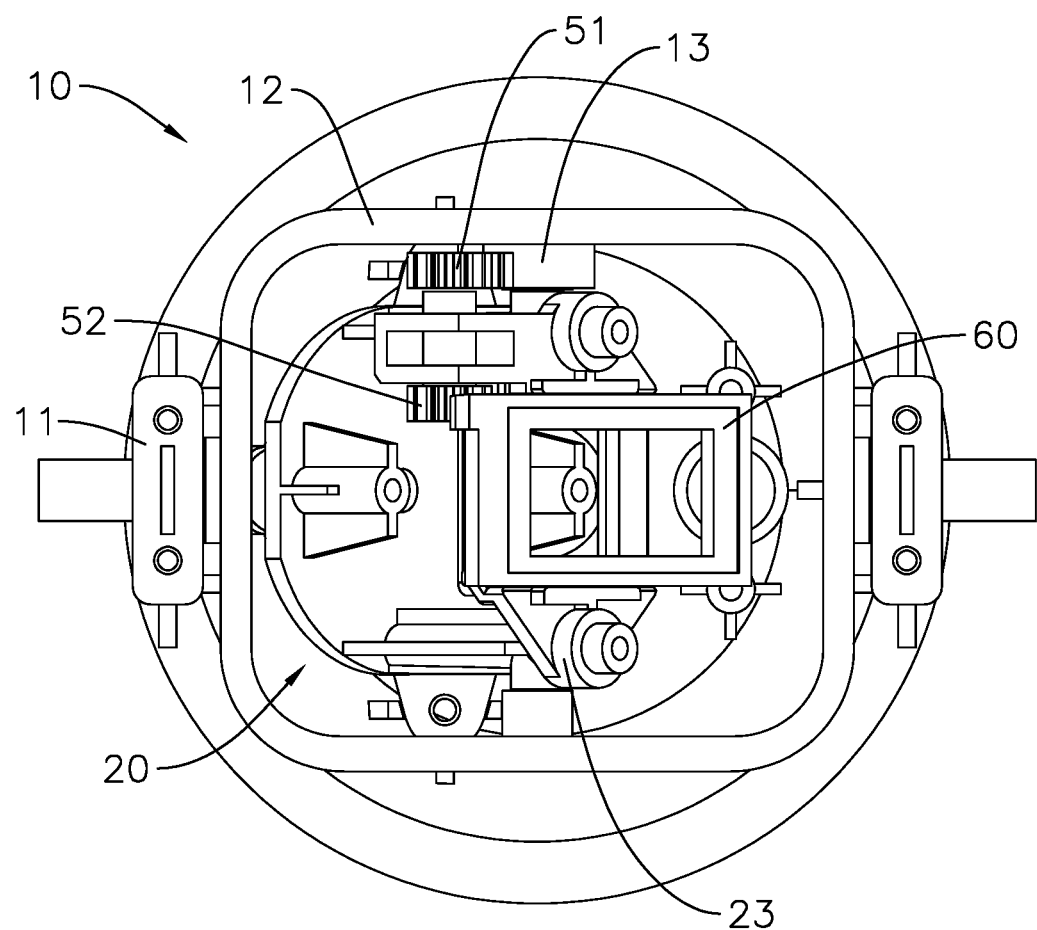
FIG. 5 is a bottom plan view of the stand, the driving assembly, and the second pattern frame of the modeling projection lamp in FIG. 1.
Figure 9:
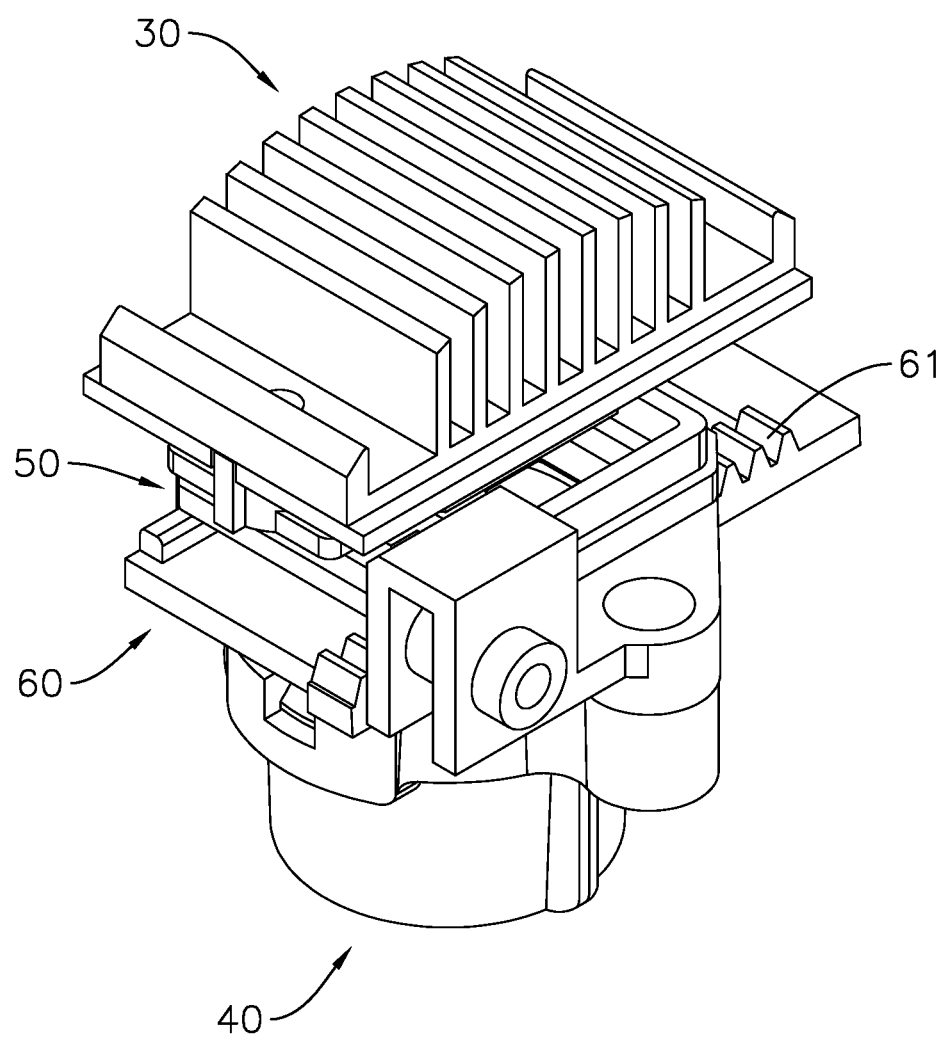
FIG. 9 is a perspective view of an illumination assembly, a lens assembly, a first pattern frame, and a second pattern frame in FIG. 1.
Figure 10:
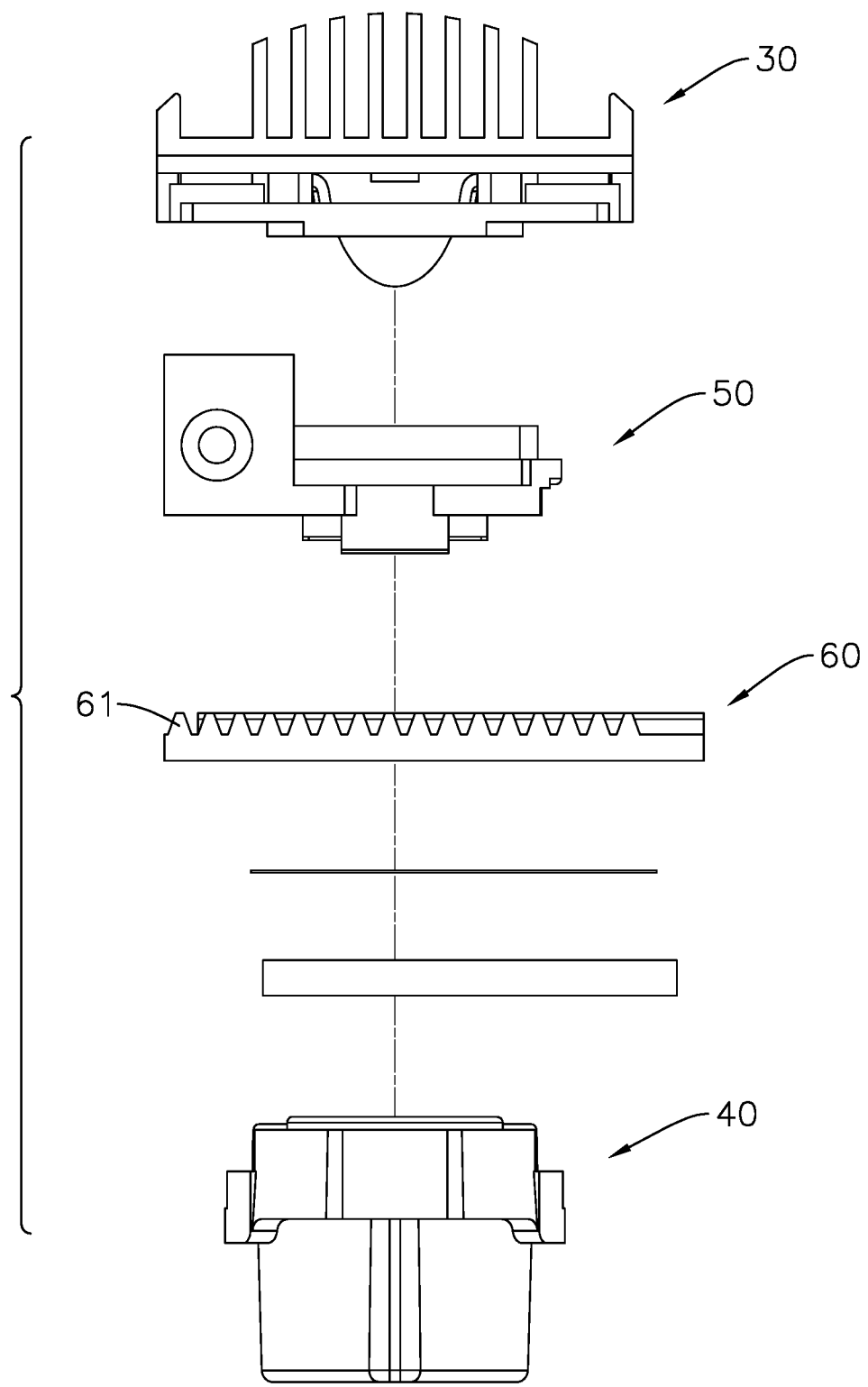
FIG. 10 is an exploded view of the illumination assembly, the lens assembly, the first pattern frame, and the second pattern frame in FIG. 1.

Then please refer to FIG. 3, FIG. 9, and FIG. 10. The illumination assembly 30, the lens assembly 40, and the first pattern frame 50 are securely mounted on the second swing bracket 23, and the second pattern frame 60 is movably or rotatably connected to the second swing bracket 23.

In this embodiment, the modeling projection lamp may selectively comprise a second gear 51 and a third gear 52. Both the second gear 51 and the third gear 52 are rotatably mounted on the first pattern frame 50, and the second gear 51 and the third gear 52 can be rotated synchronously. Precisely, the second gear 51 and third gear 52 are fixed via a fixing shaft so that they can be rotated synchronously. In this embodiment, the second pattern frame 60 comprises tooth portions 61. The tooth portions 61 may be a rack, but it is not limited thereto. The tooth portions 61 may be a spur gear, a worm gear, etc. which can be driven by a gear. The second gear 51 is engaged with the first gear 13 and the third gear 52 is engaged with the tooth portions 61 of the second pattern frame 60. Thus, the tooth portions 61 are connected to the first gear 13 via the second gear 51 and the third gear 52.

The first pattern frame 50 and the second pattern frame 60 are located between the illumination assembly 30 and the lens assembly 40. A first pattern is detachably and alternatively mounted on the first pattern frame 50 and the first pattern has a background figure. A second pattern is detachably and alternatively mounted on the second pattern frame 60 and the first pattern has a foreground figure. In another embodiment, the first pattern may have a foreground FIG. and the second pattern may have a background figure.

With aforesaid structures, the rotating mechanism 21 can drive the second pattern frame 60 to move or rotate with respect to the first pattern frame 50, so the projected image is dynamic.

Figure 11:
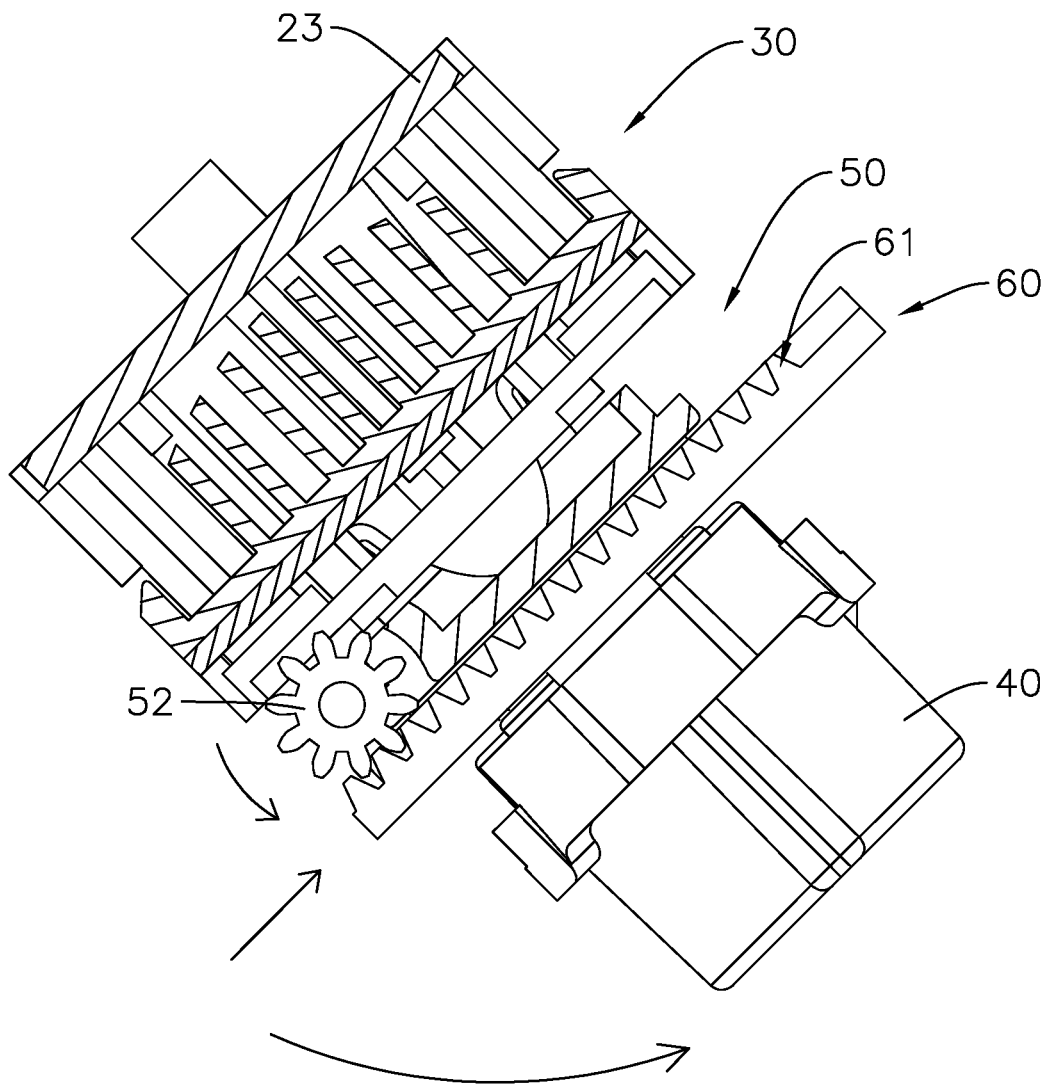
FIG. 11 to FIG. 12 are serial operational views of the first pattern frame and the second pattern frame in FIG. 1.
Figure 12:
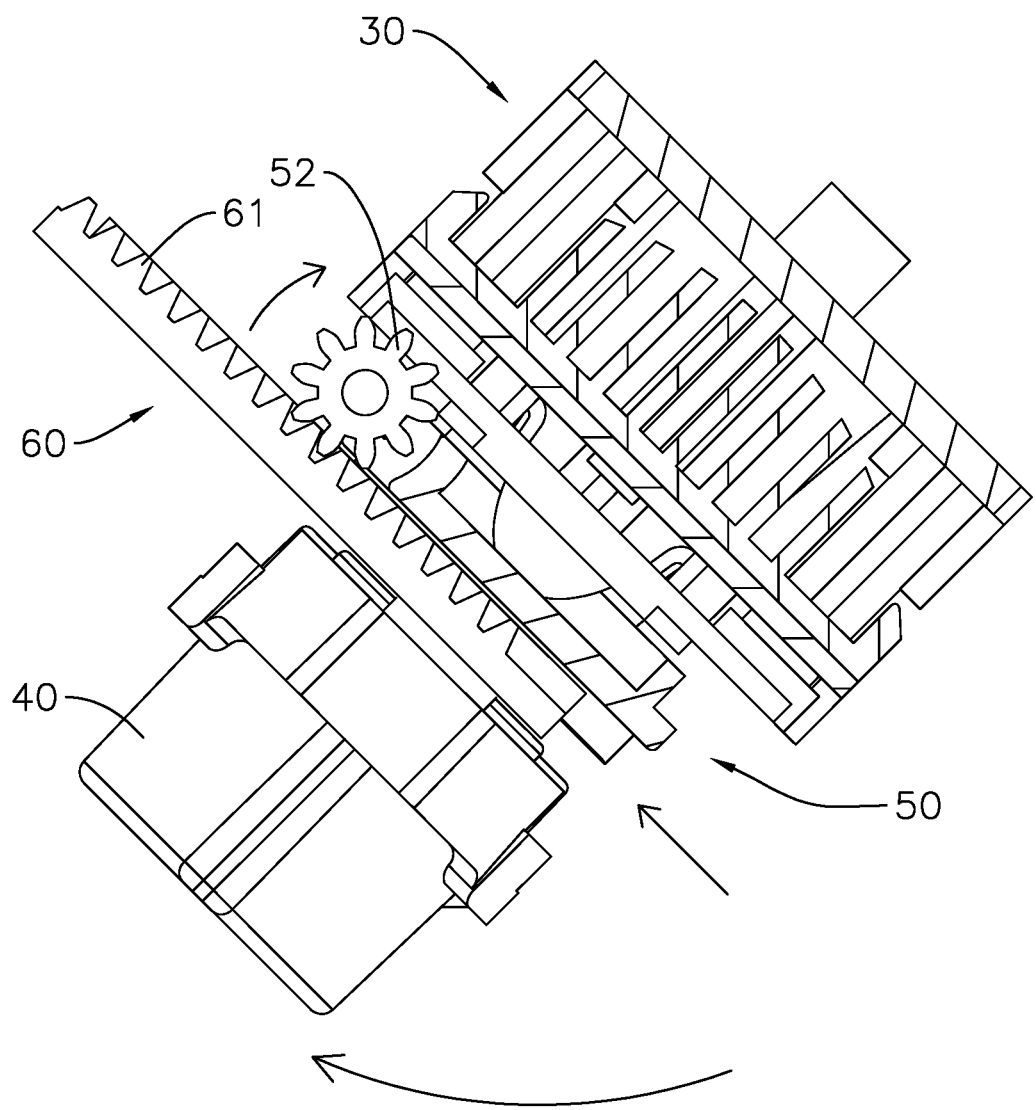
Figure 13:
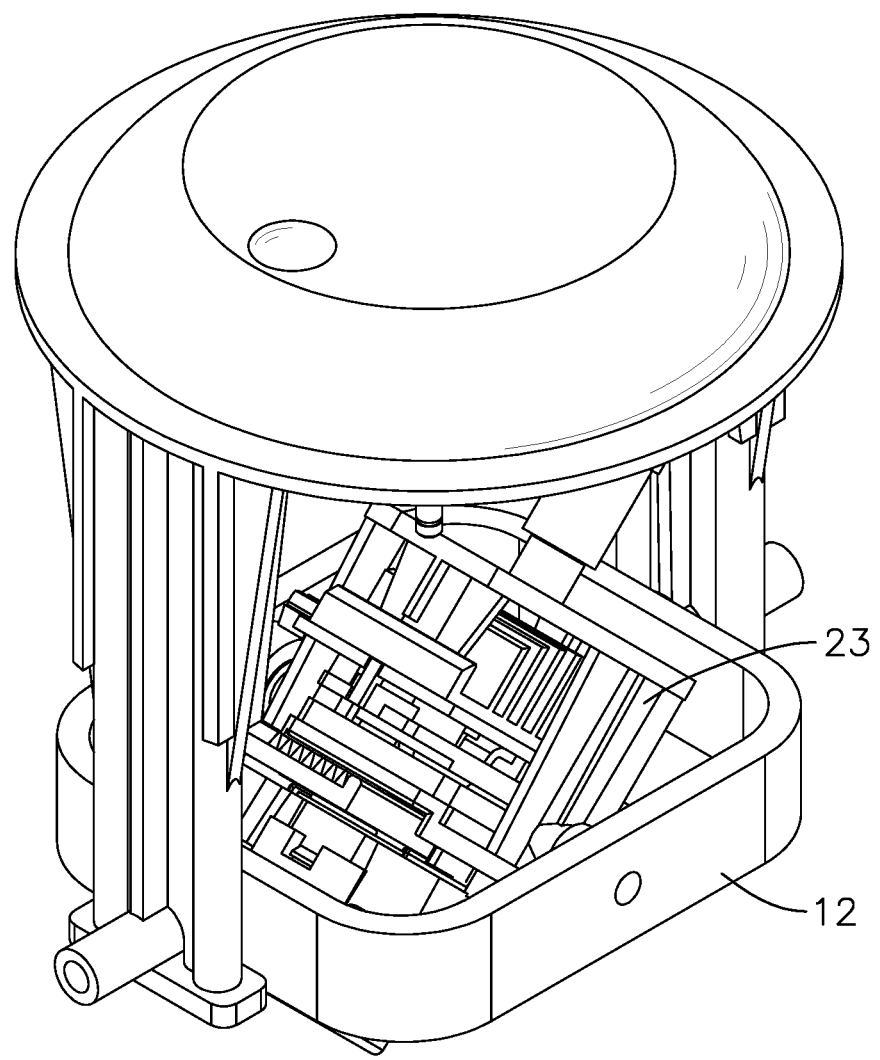
FIG. 13 to FIG. 16 are serial operational views of the first swing bracket and the second swing bracket in FIG. 1.
Figure 14:
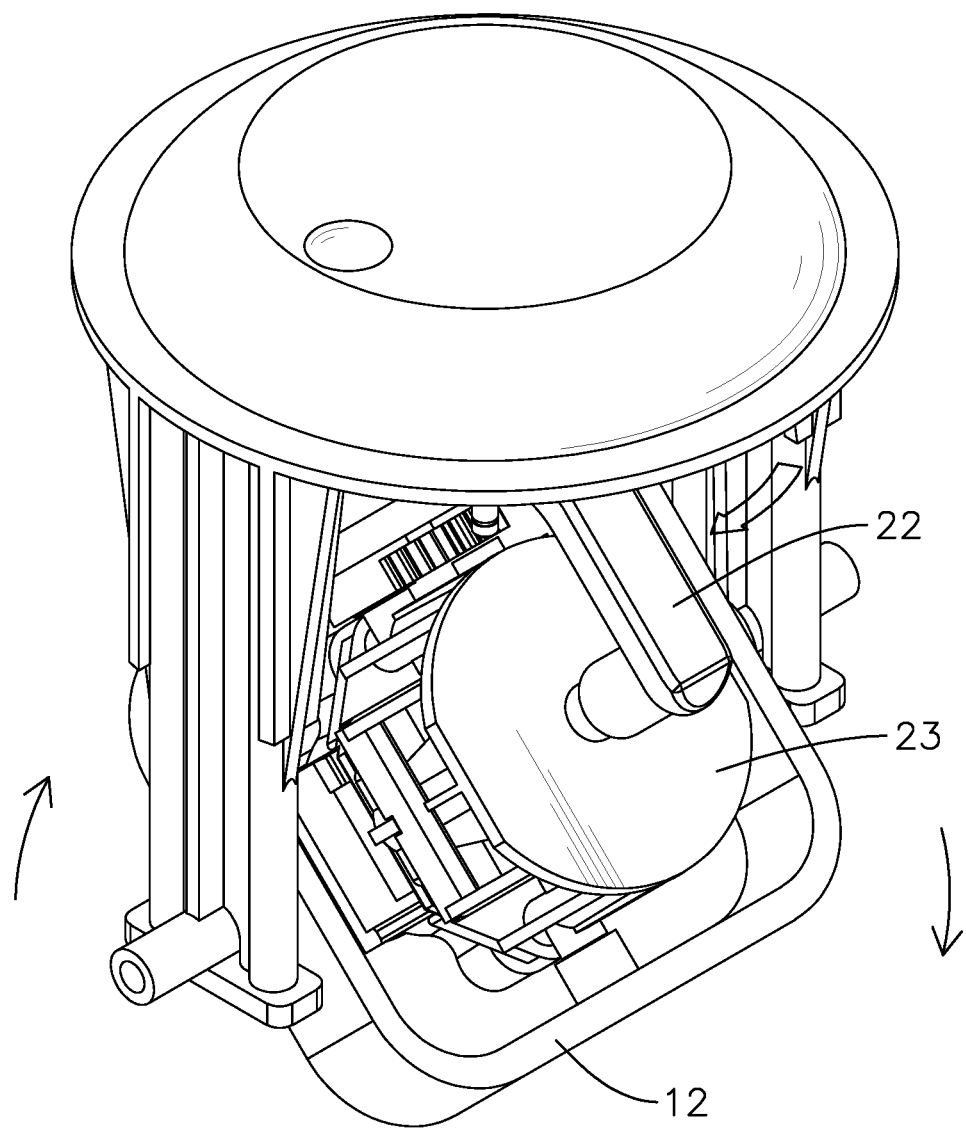
Figure 15:
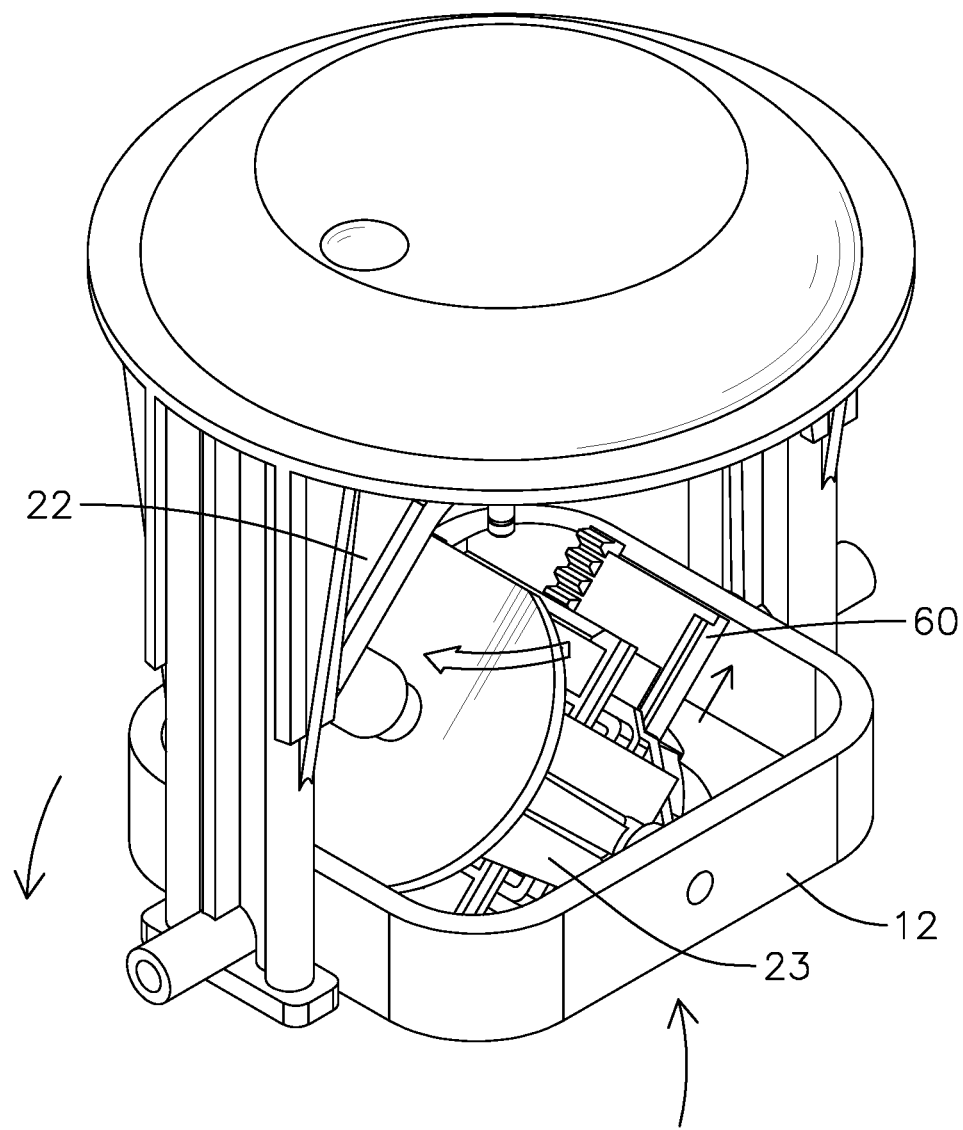
Figure 16:
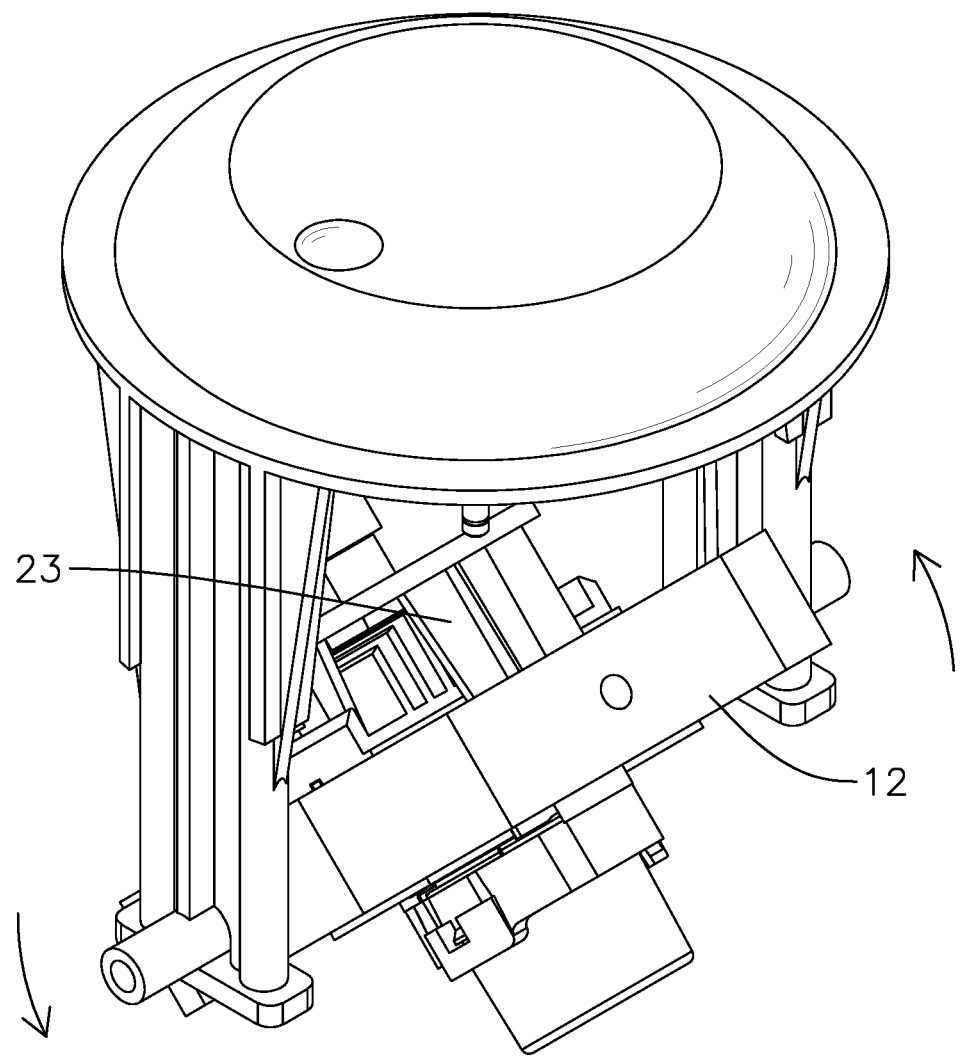

Then please refer to FIG. 11 and FIG. 12. In this embodiment, the modeling projection lamp comprises the first gear 13, the second gear 51, the third gear 52, and the tooth portions 61, which are configured to drive the second pattern frame 60. Precisely, the rotating mechanism 21 drives the rotating arm 22 to rotate, which drives the first swing bracket 12 to swing about the first axis with respect to the stationary bracket 11 and the second swing bracket 23 to swing about the second axis with respect to the first swing bracket 12 at the same time. The second swing bracket 23 is connected to the first swing bracket 12 so that the swinging first swing bracket 12 drives the second swing bracket 23 to act in two dimensions (as shown in FIG. 13 to FIG. 16). With the second swing bracket 23 swings with respect to the first swing bracket 12, the second gear 51 engaging with the first gear 13 is rotated with respect to the first gear 13. When the first gear 13 drives the second gear 51 to rotate, the third gear 52 will rotate with the second gear 51 synchronously, and then the rotating third gear 52 can drive the tooth portions 61, so the second pattern frame 60 reciprocates or rotates with respect to the first pattern frame 50.

Therefore, the second pattern on the second pattern frame 60 can reciprocate or rotate with respect to the first pattern on the first pattern frame 50. Then, the light emitted by the illumination assembly 30 passes through the first pattern and the second pattern, and then passes through the lens assembly 40 to project onto the ground or a wall. As a result, an image formed via the light passing through the first pattern and an image formed via the light passing through the second pattern may reciprocate or rotate with respect to each other. Besides, because the second swing bracket 23 is acted on two dimensions and both the first pattern frame 50 and the second pattern frame 60 are mounted on the second swing bracket 23, the images formed via the first pattern and the second pattern also act according to the second swing bracket 23.

In another embodiment, the modeling projection lamp may not have the third gear 52, but, instead, the tooth portions 61 engage with the second gear 51 directly. In other words, the tooth portions 61 are connected with the first gear 13 only via the second gear 51. When the first gear 13 drives the second gear 51 to rotate, the second gear 51 drives the tooth portions 61 and the second pattern frame 60 to reciprocate or rotate with respect to the first pattern frame 50. Therefore, in this embodiment, even without the third gear 52, the images formed via the first pattern and the second pattern still can reciprocate or rotate with respect to each other.

In another embodiment, the modeling projection lamp may not have both the second gear 51 and the third gear 52, but, instead, the tooth portions 61 engage with the first gear 13 directly. In other words, the tooth portions 61 are directly connected to the first gear 13. When the second swing bracket 23 is swung with respect to the first swing bracket 12, the first gear 13 drives the tooth portions 61 and the second pattern frame 60 to reciprocate or rotate with respect to the first pattern frame 50. In other words, in this embodiment, even without the third gear 52, the images formed via the first pattern and the second pattern still can reciprocate or rotate with respect to each other.

In another embodiment, the modeling projection lamp may not have the first gear 13, the second gear 51, the third gear 52, and the tooth portions 61. Instead, the second pattern frame 60 can move or rotate freely. In other words, when the rotating mechanism 21 drives the rotating arm 22 to rotate, the first swing bracket 12 can swing about the first axis with respect to the stationary bracket 11 and the second swing bracket 23 can swing about the second axis with respect to the first swing bracket 12. With swinging of the first swing bracket 12 or the second swing bracket 23, the second pattern frame 60 is tilted, thereby reciprocating or rotating with respect to the first pattern frame 50 because of the gravity.

Consequently, in the present invention, the illumination assembly 30 and the lens assembly 40 project light through the first pattern and the second pattern and thus form an image. With the driving assembly 20 driving the second pattern frame 60 and the first pattern frame 50 to move or rotate with respect to each other, the images formed via the first pattern and the second pattern can reciprocate or rotate with respect to each other, so the entire image is dynamic. Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A modeling projection lamp comprising:
    a stand comprising:
       a stationary bracket; and
       a first swing bracket connected to the stationary bracket and capable of swinging about a first axis with respect to the stationary bracket; and
    a driving assembly comprising:
       a rotating mechanism;
       a rotating arm comprising:
          a first end rotatably connected to the rotating mechanism; and
          a second end opposite the first end; and
       a second swing bracket rotatably connected to the second end of the rotating arm and connected to the first swing bracket, the second swing bracket capable of swinging about a second axis with respect to the first swing bracket, and the second axis being non-parallel with the first axis;
    an illumination assembly securely mounted on the second swing bracket;
    a lens assembly securely mounted on the second swing bracket;
    a first pattern frame securely mounted on the second swing bracket and located between the illumination assembly and the lens assembly; and
    a second pattern frame movably connected to the second swing bracket and located between the illumination assembly and the lens assembly;
    wherein when the rotating arm is rotated, the first swing bracket is driven to swing about the first axis with respect to the stationary bracket, and the second swing bracket is driven to swing about the second axis with respect to the first swing bracket at the same time, so that after the first swing bracket or the second swing bracket is swung, the second pattern frame is tilted, thereby reciprocating or rotating with respect to the first pattern frame because of gravity.

2. A modeling projection lamp comprising:
    a stand comprising:
       a stationary bracket;
       a first swing bracket connected to the stationary bracket and capable of swinging about a first axis with respect to the stationary bracket; and
       a first gear securely mounted on the first swing bracket;
    a driving assembly comprising:
       a rotating mechanism;
       a rotating arm comprising:
          a first end rotatably connected to the rotating mechanism; and
          a second end opposite the first end; and
       a second swing bracket rotatably connected to the second end of the rotating arm and connected to the first swing bracket, the second swing bracket capable of swinging about a second axis with respect to the first swing bracket, the second axis being non-parallel with the first axis;
    an illumination assembly securely mounted on the second swing bracket;
    a lens assembly securely mounted on the second swing bracket;
    a first pattern frame securely mounted on the second swing bracket and located between the illumination assembly and the lens assembly; and
    a second pattern frame movably connected to the second swing bracket and located between the illumination assembly and the lens assembly; the second pattern frame comprising:
       a plurality of tooth portions, the tooth portions connected to the first gear;
    wherein when the rotating arm is rotated, the first swing bracket is driven to swing about the first axis with respect to the stationary bracket, and the second swing bracket is driven to swing about the second axis with respect to the first swing bracket at the same time, so that when the second swing bracket swings with respect to the first swing bracket, the first gear is capable of driving the tooth portions, thereby driving the second pattern frame to reciprocate or rotate with respect to the first pattern frame.

3. The modeling projection lamp as claimed in claim 2 further comprising:
    a second gear rotatably mounted on the first pattern frame and engaging with the first gear; the tooth portions connected to the first gear via the second gear; the first gear capable of driving the second gear to rotate, thereby driving the tooth portions and the second pattern frame to reciprocate or rotate with respect to the first pattern frame.

4. The modeling projection lamp as claimed in claim 3 further comprising:
    a third gear rotatably mounted on the first pattern frame and capable of rotating synchronously with the second gear; the tooth portions engaging with the third gear and the tooth portions connected to the first gear via the second gear and the third gear; wherein when the first gear drives the second gear to rotate, the third gear rotates synchronously and drives the tooth portions, and thereby drives the tooth portions and the second pattern frame to reciprocate or rotate with respect to the first pattern frame.

5. The modeling projection lamp as claimed in claim 2, wherein the first axis and the second axis are perpendicular to each other.

6. The modeling projection lamp as claimed in claim 4, wherein the first axis and the second axis are perpendicular to each other.

7. The modeling projection lamp as claimed in claim 2, wherein the tooth portions of the second pattern frame form a rack.

8. The modeling projection lamp as claimed in claim 6, wherein the tooth portions of the second pattern frame form a rack.

9. The modeling projection lamp as claimed in claim 2, wherein an axis of the first gear is located on an imaginary extending line of the second axis.

10. The modeling projection lamp as claimed in claim 8, wherein an axis of the first gear is located on an imaginary extending line of the second axis.

11. The modeling projection lamp as claimed in claim 2, wherein the modeling projection lamp further comprises a casing, and the stand, the driving assembly, the illumination assembly, and the lens assembly are located in the casing.

12. The modeling projection lamp as claimed in claim 10, wherein the modeling projection lamp further comprises a casing, and the stand, the driving assembly, the illumination assembly, and the lens assembly are located in the casing.

13. The modeling projection lamp as claimed in claim 11, wherein the casing further comprises a ring.

14. The modeling projection lamp as claimed in claim 12, wherein the casing further comprises a ring.

\* \* \* \* \*